(12) United States Patent
Takeuchi et al.

(10) Patent No.: US 6,641,953 B2
(45) Date of Patent: Nov. 4, 2003

(54) SECONDARY CELL WITH HIGH RATE PULSE CAPABILITY

(75) Inventors: Esther S. Takeuchi, East Amherst, NY (US); Robert S. Rubino, Williamsville, NY (US); Hong Gan, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 114 days.

(21) Appl. No.: 09/756,889

(22) Filed: Jan. 9, 2001

(65) Prior Publication Data

US 2001/0053484 A1 Dec. 20, 2001

Related U.S. Application Data

(60) Provisional application No. 60/175,709, filed on Jan. 12, 2000.

(51) Int. Cl.[7] .................................................. H01M 2/00
(52) U.S. Cl. ................. 429/163; 429/231.2; 429/231.3; 429/231.4; 429/231.8; 429/231.9; 429/217; 429/231.1; 429/245; 429/322; 429/323; 429/330; 429/332
(58) Field of Search ........................... 429/231.4, 231.8, 429/231.9, 231.1, 217, 332, 163, 231.3, 231.2, 322, 323, 245, 330; 29/623.1

(56) References Cited

U.S. PATENT DOCUMENTS

| | | | |
|---|---|---|---|
| 5,565,284 A | 10/1996 | Koga et al. | 429/218 |
| 5,612,155 A | 3/1997 | Takami et al. | 429/218 |
| 5,672,445 A | 9/1997 | Nakamitsu et al. | 429/218 |
| 5,677,083 A | 10/1997 | Tomiyama | 429/194 |
| 5,773,168 A | 6/1998 | Kubo et al. | 429/223 |
| 5,814,075 A | 9/1998 | Kroll | |
| 5,849,025 A | 12/1998 | Owens et al. | |
| 5,849,431 A | 12/1998 | Kita et al. | 429/164 |
| 5,962,167 A | 10/1999 | Nakai et al. | 429/231.1 |
| 6,008,625 A * | 12/1999 | Gan et al. | 320/127 |
| 6,040,086 A | 3/2000 | Yoshida et al. | 429/211 |
| 6,053,953 A | 4/2000 | Tomiyama et al. | 29/623.1 |
| 6,087,809 A * | 7/2000 | Gan et al. | 320/127 |
| 6,090,506 A | 7/2000 | Inoue et al. | 429/232 |
| 6,203,942 B1 * | 3/2001 | Gan et al. | 429/203 |
| 6,238,813 B1 * | 5/2001 | Maile et al. | 429/176 |

FOREIGN PATENT DOCUMENTS

| | | |
|---|---|---|
| EP | 0 780 918 A1 | 6/1997 |
| EP | 0 854 529 A1 | 7/1998 |
| EP | 0 896 374 A1 | 2/1999 |
| EP | 0 9676 77 A1 | 12/1999 |
| GB | 2 324 404 | 10/1998 |
| JP | 9-161772 * | 6/1997 |
| WO | WO 00/25376 | 5/2000 |
| WO | WO 01/17054 A1 | 3/2001 |

* cited by examiner

*Primary Examiner*—Laura Weiner
(74) *Attorney, Agent, or Firm*—Michael F. Scalise

(57) ABSTRACT

A rechargeable lithium-ion cell capable of being discharged to deliver high power pulses sufficient for implantable defibrillation applications and the like, is described. The cell is housed in a casing having an external volume of 5 $cm^3$, or less. Both the negative and positive electrodes are less than about 0.15 mm in total thickness. Negative and positive electrodes of a reduced thickness provide the cell with high electrode surface area relative to its volume. As such, the present cell is capable of providing pulses in excess of 30C with minimal voltage drop.

52 Claims, 3 Drawing Sheets

SECONDARY CELL WITH HIGH RATE PULSE CAPABILITY

CROSS-REFERENCE TO RELATED APPLICATION

The present application claims priority based on provisional application Serial No. 60/175,709, filed Jan. 12, 2000.

BACKGROUND OF INVENTION

1. Field of the Invention

The present invention generally relates to the conversion of chemical energy to electrical energy and, more particularly, to a lithium-ion secondary cell having a total size of less than about 5 cm$^3$ and which is capable of being pulse discharged.

2. Prior Art

Secondary cells, which shuttle lithium between the anode and cathode, are well know in the art. These cells, typically referred to as lithium-ion cells, have a negative electrode of a carbonaceous anode material and a positive electrode of a porous cathode active material composed of a lithiated metal oxide. Cells of this type are widely available commercially and are typically rated up to a 2C constant current discharge. The typical coating thickness for the anode and cathode active materials of the respective negative and positive electrodes for these prior art cells is on the order of 0.08 mm per side of current collector. This means the electrodes are usually greater than about 0.15 mm thick. Such coating thicknesses result in secondary cells having less coated current collector surface area, higher internal resistance, less pulse power and longer total cell volume than that of the present invention secondary cell. In part, lithium-ion cells having electrodes of a thickness greater than about 0.15 mm are not able to provide enough surface area to be housed in a casing having a total external volume less than about 5.0 cm$^3$ and to be pulse discharged.

For example, U.S. Pat. No. 5,411,537 to Munshi et al. describes a "AA" size rechargeable cell for powering a bioimplantable device. The inventors of the present invention secondary cell simulated the electrode design and discharge performance of various lithium rechargeable chemistries based on the Munshi et al. patent. In order to satisfy the power requirements of an implantable medical device, it was determined that secondary cells according to Munshi et al. require a casing volume which is much larger than the 5 cm$^3$ total size of the present secondary cell. In fact, the Munshi et al. cell is described as weighing 18 grams and having a total volume of 8 cm$^3$.

SUMMARY OF THE INVENTION

Accordingly, the present invention provides a rechargeable lithium-ion cell capable of being discharged to deliver high power pulses sufficient for implantable defibrillator applications. Another objective is to provide a secondary cell which is less than about 5 cm$^3$ in total volume. Still another objective is to provide a secondary cell with minimal self-discharge, as required for implantable medical device applications.

The rechargeable cell of the present invention comprises a negative electrode of a carbonaceous material or a material capable of forming an alloy with lithium. The cathode active material of the negative electrode is preferably a metal oxide while the electrolyte is one of a non-aqueous liquid electrolyte, a polymer electrolyte, and a gel-type electrolyte. Both the negative and the positive electrodes of the present invention secondary lithium-ion rechargeable cell are less than about 0.15 mm in total thickness. This includes the thickness of the current collector and the electrode active material on the opposed current collector sides. Electrodes of a reduced thickness provide the cell with high electrode surface area relative to its volume. As such, the present cell is capable of providing pulses in excess of 30C with minimal voltage drop. Because the cell can be recharged and has high power pulse capability, it has low capacity and, therefore, minimal volume. Furthermore, self-discharge of the present invention cell is relatively low in an absolute capacity sense, which is desirable when recharging the cell from a high energy density internal power supply.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

Figure 1:
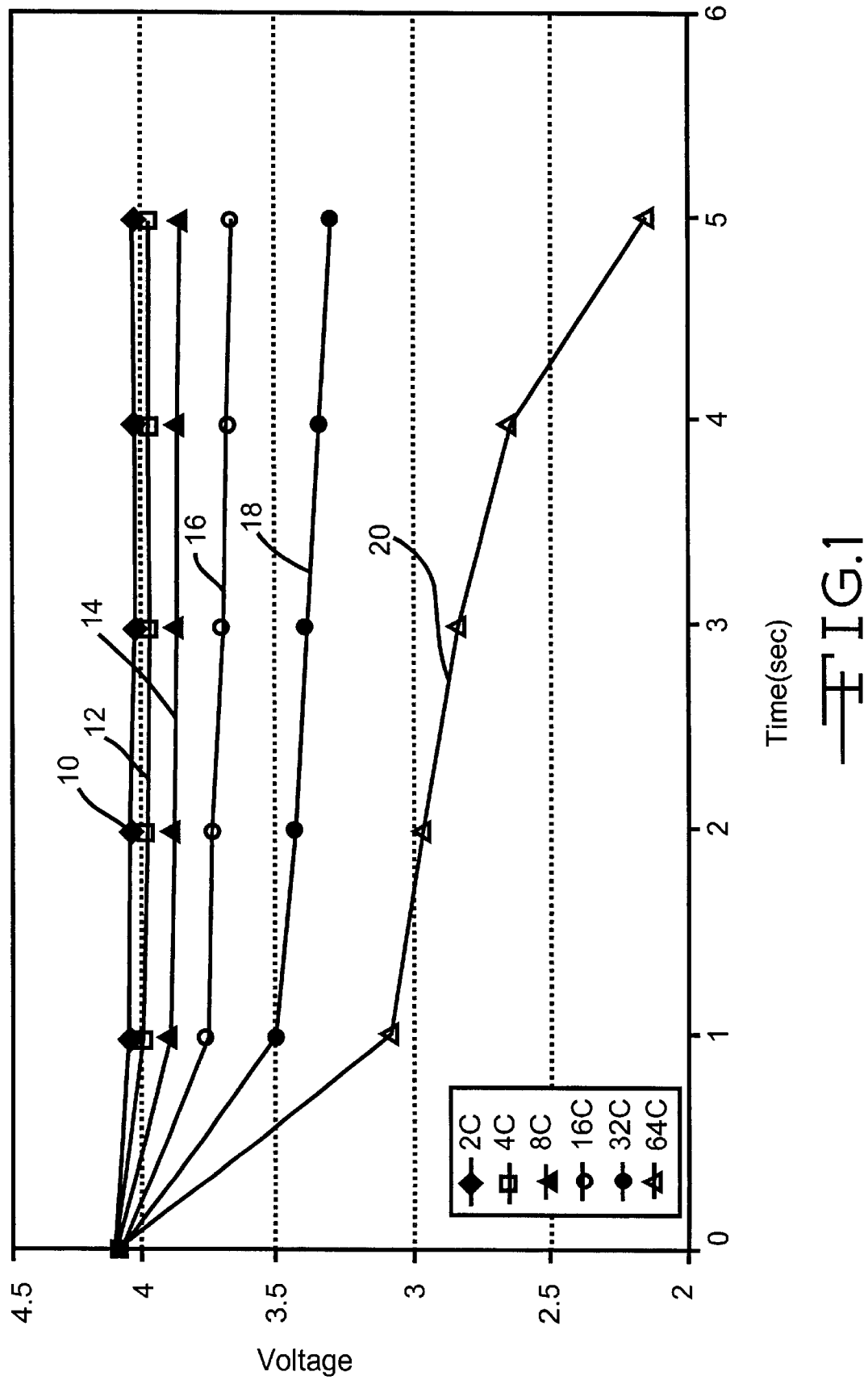
FIG. 1 is a graph constructed from the pulse voltage versus time of various cells according to the present invention during pulses ranging from two times capacity to 64 times capacity.

As used herein, the term "pulse" means a short burst of electrical current of a significantly greater amplitude than that of a prepulse current immediately prior to the pulse. A pulse train consists of at least two pulses of electrical current delivered in relatively short succession with or without open circuit rest between the pulses.

As used herein, the term "electrode surface area to volume ratio" is defined as the total coated surface area of the positive electrode in cm$^2$ divided by the total external cell volume in cm$^3$.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species, is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes capable of withstanding degradation during repeated charge/discharge cycling. Moreover, the high surface area of carbon fibers allows for rapid charge/discharge rates.

A typical negative electrode is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

An important aspect of the present invention is that fabrication of the negative electrode includes thoroughly mixing the anode material and the binder with an organic solvent such as N-methyl-pyrrolidimone to form a slurry. This slurry is coated on both sides of the negative electrode current collector. The resulting negative electrode is then pressed to a final total thickness of less than about 0.15 mm., and more preferably less than about 0.11 mm.

The negative electrode further has an extended tab or lead of the same material as the anode current collector, i.e., preferably nickel, integrally formed therewith such as by welding and contacted by a weld to a cell case of conductive metal in a case-negative electrical configuration.

The cathode or positive electrode of the present secondary cell preferably comprises a lithiated material as a cathode active material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

Before fabrication into a positive electrode for incorporation into an electrochemical cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The positive electrode further comprises a fluoro-resin binder, preferably in a powder form, such as PTFE, PVDF, ETFE, polyamides, polyimides, and mixtures thereof. Suitable materials for the cathode current collector include aluminum, copper, stainless steel and nickel in the form of a foil or screen contacted with the cathode active mixture by casting, pressing, rolling and the like.

An important aspect of the present invention is that fabrication of the positive electrode includes thoroughly mixing the cathode active mixture comprising the lithiated material, binder and conductive diluent with an organic solvent such a N-methyl-pyrrolidimone to form an active slurry. This slurry is coated on both sides of the cathode current collector. The resulting positive electrode is then pressed to a final total thickness of less than about 0.15 mm., and more preferably less than about 0.11 mm. thick.

The secondary cell of the present invention includes a separator to provide physical segregation between the negative and positive electrodes. The separator is of an electrically insulative material to prevent an internal electrical short circuit conditions, and the separator material also is chemically unreactive with the negative and positive electrodes including the anode and cathode active materials and both chemically unreactive with and insoluble in the electrolyte. In addition, the separator material has a degree of porosity sufficient to allow flow there through of the electrolyte during the electrochemical reactions of the cell. The form of the separator typically is a sheet that is placed between the negative and positive electrodes.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, glass fiber materials, ceramics, a polytetraflouroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The choice of an electrolyte solvent system for activating a fully charged lithium ion cell is very limited due to the high potential of the cathode material (up to 4.3 V vs. $Li/Li^{30}$ for $Li/Li_{1-x}CoO_2$) and the low potential of the anode material (0.01 V vs. $Li/Li^+$ for graphite). According to the present invention, suitable nonaqueous electrolytes are comprised of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC), ethylpropyl carbonate (EPC), and mixtures thereof, and at least one cyclic carbonate selected from propylene carbonate (PC), ethylene carbonate (EC), butylene carbonate (BC), vinylene carbonate (VC), and mixtures thereof. Organic carbonates are generally used in the electrolyte solvent system for such battery chemistries because they exhibit high oxidative stability toward cathode active materials and good kinetic stability toward anode active materials.

Preferred electrolytes according to the present invention comprise solvent mixtures of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion cells activated with such mixtures have very good cycling behavior at room temperature as well as very good discharge and charge/discharge cycling behavior at temperatures below −40° C. Another preferred solvent system is a 30:70 by volume mixture of EC/DMC.

Known lithium salts that are useful as a vehicle for transport of alkali metal ions from the negative electrode to the positive electrode, and back again include $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiNO_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof. Suitable salt concentrations typically range between about 0.8 to 1.5 molar.

To charge such secondary cells, the lithium metal comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such materials as manganese dioxide, silver vanadium oxide, copper silver vanadium oxide, titanium disulfide, copper oxide, copper sulfide, iron sulfide, iron disulfide, carbon and fluorinated carbon. However, this approach is compromised by the problems associated with handling lithiated carbon outside of the cell. Lithiated carbon tends to react with explosive results when contacted by air.

The preferred chemistry for the present rechargeable cells has a positive electrode of 91% $LiCoO_2$, 6% graphite additive and 3% PVDF binder, by weight, contacted to an aluminum foil current collector, and a negative electrode of 91.7% graphite and 8.3% PVDF binder, by weight, on a copper foil. This couple is activated with the quaternary carbonate solvent system of DMC, DEC, EMC and EC having a lithium salt electrolyte dissolved therein.

The assembly of the cell described herein is preferably in the form of a wound element cell. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted in to a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

An important aspect of the present invention is that the total cell volume including that of the casing is less than about 5.0 $cm^3$, and more preferably less than about 3.0 $cm^3$. With the negative and positive electrodes each having a total thickness of less than about 0.15 mm., a 5.0 $cm^3$ external case volume results in a ratio of the surface area of the cathode active material contacted to the cathode current collector to the external casing volume being greater than 25 $cm^{-1}$. Another preferred embodiment of the present invention is the negative and positive electrodes each having a total thickness of less than about 0.11 mm. In a case having a 3.0 $cm^3$ external volume, this results in a ratio of the surface area of the cathode active material contacted to the cathode current collector to the external casing volume being greater than 35 $cm^{-1}$. A ratio of the surface area of the cathode active material contacted to the cathode current collector to the external casing volume greater than 25 $cm^{-1}$, and more preferably greater than 35 $cm^{-1}$, provides a lithium-ion secondary cell that is capable of being discharged to deliver high current pulses. Such a cell has relatively low energy density and, therefore, needs to be recharged frequently or used in applications where the cell is rarely needed.

According to another embodiment of the present invention, the present lithium-ion secondary cell is paired with a second implantable cell of relatively high energy density such as a $Li/CF_x$ cell. The high energy density cell is used to recharge the present cell inside an implantable medical device such as a cardiac defibrillator. It is also contemplated by the scope of the present invention that the lithium-ion secondary cell is combined with another secondary cell such as a lithium-ion cell having thicker electrodes and, therefore, higher energy density. The two cells can be in separate cases, or in the same case as described in U.S. Pat. No. 5,614,331 to Takeuchi et al., which patent is assigned to the assignee of the present invention and incorporated herein by reference.

This above assembly describes a case-negative cell, which is the preferred construction for the exemplary secondary cell of the present invention. As is well known to those skilled in the art, the electrochemical system of the present invention can also be constructed in a case-positive configuration.

The following examples describe the manner and process of an electrochemical cell according to the present invention, and set forth the best mode contemplated by the inventors of carrying out the matter, but are not to be construed as limiting.

EXAMPLE I

A slurry was prepared by mixing graphitic carbon fibers, PVDF binder and N-methyl-pyrrolidone. The slurry was knife-over-roll coated onto both sides of a 0.010 mm thick copper foil at a dry weight of 2.4 $mg/cm^2$ per side. Negative electrodes were cut to provide 95 $cm^2$ of total coated surface area, i.e., the total coated surface area of both sides of the copper current collector, and then pressed between two plates to a final total thickness of about 0.045 mm. for the negative electrodes.

A second slurry was prepared by mixing $LiCoO_2$, PVDF binder, graphite, and N-methyl-pyrrolidone. The slurry was knife-over-roll coated onto both sides of a 0.025 mm thick aluminum foil at a dry weight of 6.5 $mg/cm^2$ per side. Positive electrodes were cut to provide 80 $cm^2$ of total coated surface area, i.e., the total coated surface area of both sides of the aluminum current collector, and then pressed between two plates to a final total thickness of about 0.068 mm. for the positive electrodes.

The negative and positive electrodes were then spirally wound with a layer of polyethylene separator between them. A plurality of lithium-ion cells were built, each having a diameter of about 7.3 mm and a height of about 31.2 mm for a total external volume of about 1.3 cm$^3$. The cell stack was hermetically sealed in a stainless steel case and activated with an electrolyte consisting of 1M LiPF$_6$ in 30:70 EC/DMC. These cells had a ratio of the surface area of the cathode active material contacted to the cathode current collector to the external casing volume of 61.5 cm$^{-1}$.

EXAMPLE II

A series of 5-second pulses was applied to various ones of the cells built according to Example I at progressively higher currents. FIG. 1 is a plot of voltage versus time during pulses ranging from two times capacity (2C) to 64 times capacity (64C) for the cells. All of the cells maintained a voltage greater than two volts upon being discharged at up to a 64C pulse. In FIG. 1, curve 10 was constructed from one of the cells discharged at 2C, curve 12 was constructed from a cell discharged at 4C, curve 14 was constructed from a cell discharged at 8C, curve 16 was constructed from a cell discharged at 16C, curve 18 was constructed from a cell discharged at 32C and curve 20 was constructed from a cell discharged at 64C. FIG. 1 demonstrates the high pulse power capability a lithium ion cell of the present invention.

Figure 2:
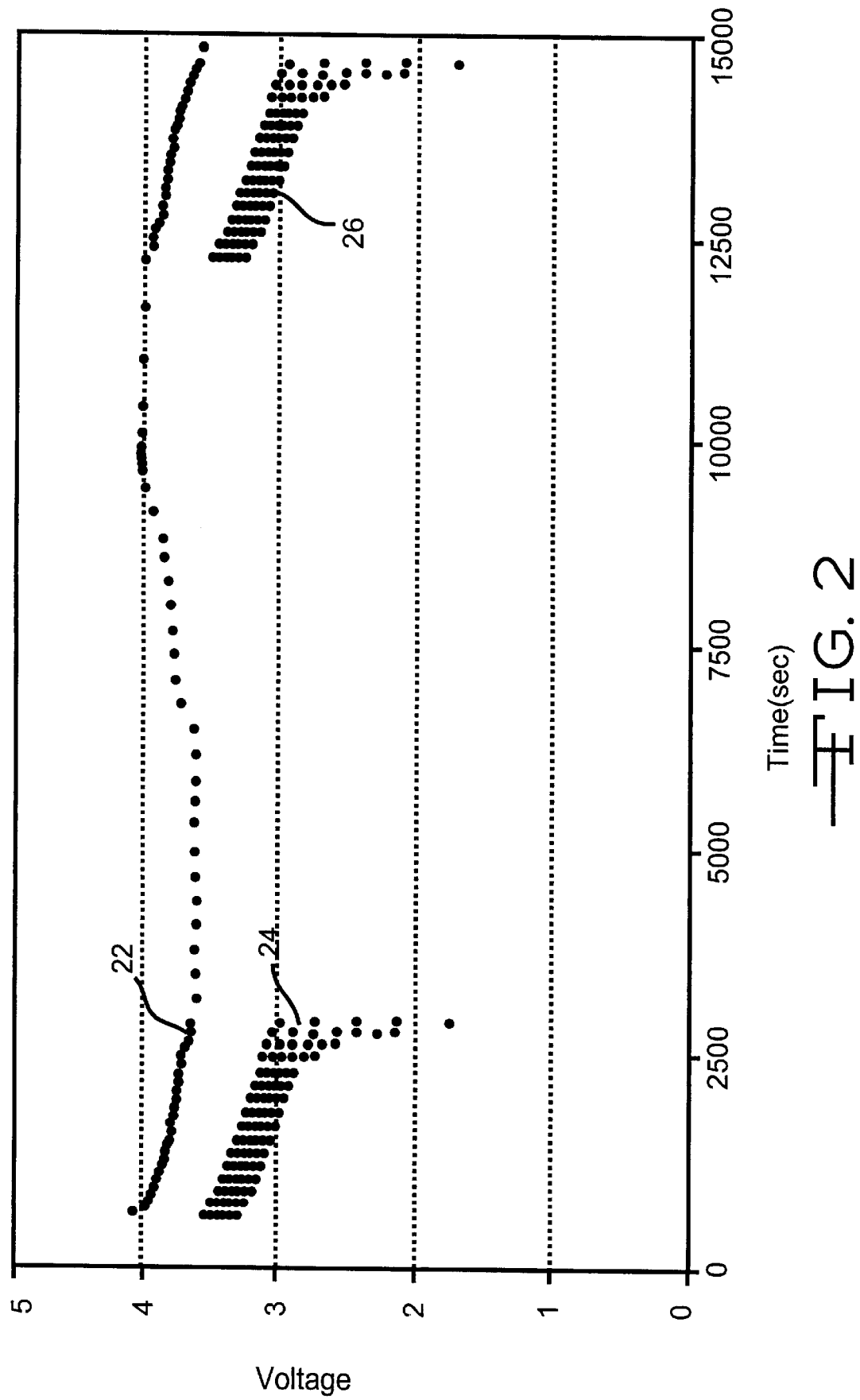
FIG. 2 is a graph constructed from the pulse discharge results of a representative one of the cells according to the present invention subjected to consecutive 1.5 A pulsing with 28.8 J of total energy per pulse.

FIG. 2 was constructed from the pulse discharge results of a representative one of the cells subjected to consecutive 1.5 A pulsing with 28.8 J of total energy per pulse. In particular, curve 22 was constructed from the prepulse potential of the cell and curve 24 was constructed from the pulse discharge of the cell. The cell delivered 18 pulses before dropping below 2 V on the 19$^{th}$ pulse. The cell was then recharged and pulsed as before. Curve 26 was constructed from this second pulse discharge of the cell. The cell again delivered 18 pulses. FIG. 2 demonstrates the excellent cycleability of the inventive cell.

Figure 3:
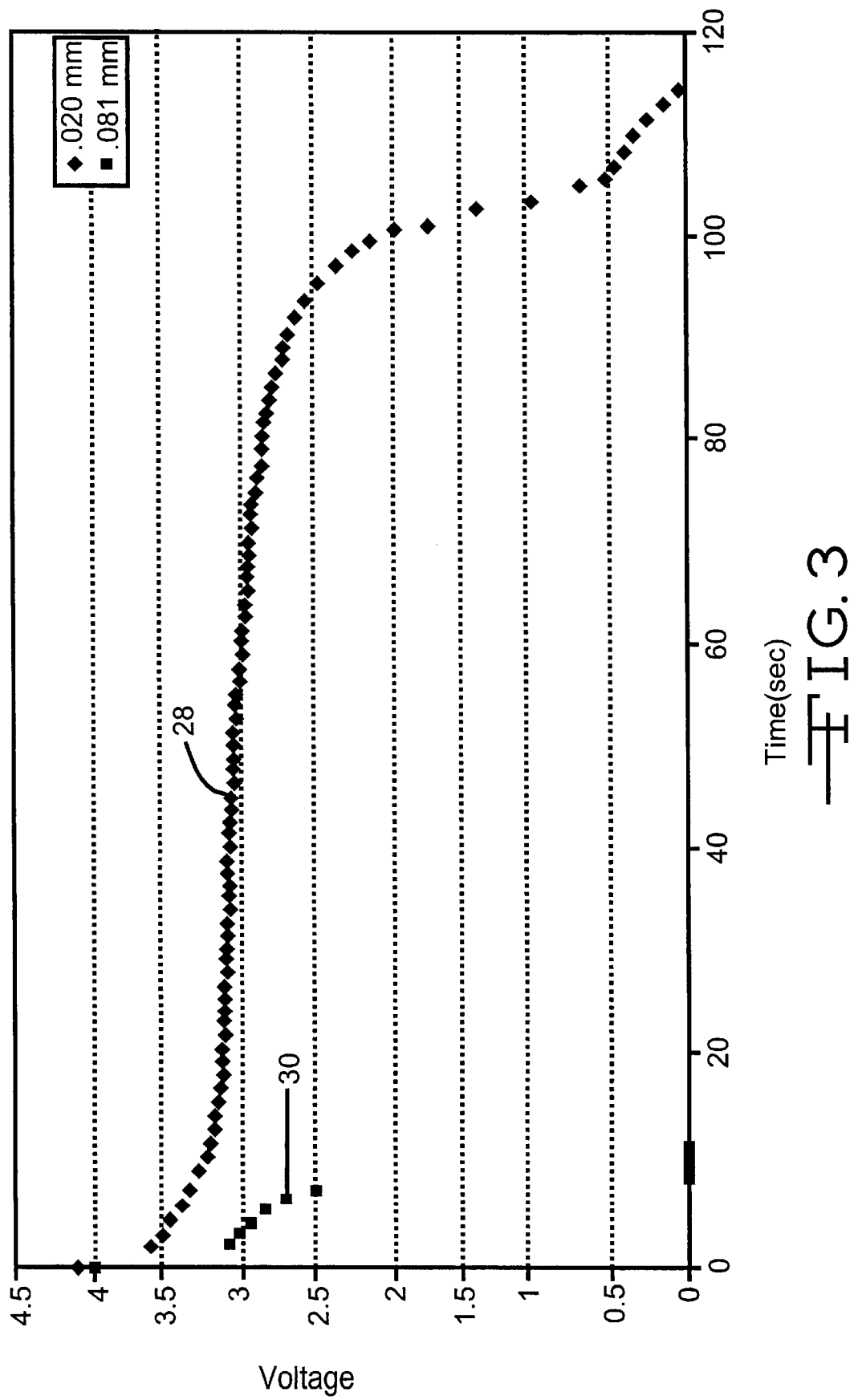
FIG. 3 is a graph constructed from the constant current discharge of a high surface area cell of the present invention in comparison to a cell built according to the prior art.

FIG. 3 shows a 1.6 A constant current discharge (curve 28) for a representative one of the high surface area cells of the present invention. The cell delivered almost full capacity at greater than 2.5 V. This cell easily meets the power requirements for an implantable medical device such as a cardiac defibrillator.

Comparative Example I

A lithium ion electrochernical cell was built having a chemistry identical to that described in Example I. However, the negative electrode and the positive electrode had the active mixtures coated on the respective copper and aluminum current collectors at a thickness of about 0.081 mm per side. This provided the negative electrode and the positive electrode each having a total thickness of about 0.19 mm. The electrodes were spirally wound with a layer of polyethylene separator between them to provide a total electrode assembly volume of about 1.3 cm$^3$. The comparative cell had a ratio of the surface area of the cathode active material contacted to the cathode current collector to the external casing volume of 18 cm$^{-1}$.

The cell was pulse discharged in a similar manner as that described in Example II. As shown in FIG. 3, curve 30, this cell dropped to 0 V after 7 seconds. A cell according to the prior art would not be an adequate power supply for an implantable defibrillator.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
    a) a casing;
    b) a negative electrode of an anode material that intercalates and deintercalates with an alkali metal and that is contacted to an anode current collector comprised of first and second spaced apart major sides, wherein the anode material contacted to at least one of the first and second major sides is about 0.07 mm thick, or less;
    c) a positive electrode comprising a cathode active material that intercalates and deintercalates with the alkali metal and that is contacted to a cathode current collector comprised of third and fourth spaced apart major sides, wherein the cathode active material contacted to at least one of the third and fourth major sides is about 0.0625 mm thick, or less; and
    d) an electrolyte solution activating the negative and positive electrodes housed inside the casing.

2. The electrochemical cell of claim 1 wherein with the anode material contacted to both the first and second major sides of the anode current collector, the negative electrode has a total thickness, including the anode current collector, less than about 0.15 mm thick.

3. The electrochemical cell of claim 2 wherein the total thickness of the negative electrode, including the anode current collector, is less than about 0.11 mm.

4. The electrochemical cell of claim 1 wherein with the cathode active material contacted to both the third and fourth major sides of the cathode current collector, he positive electrode has a total thickness, including the cathode current collector, less than about 0.15 mm thick.

5. The electrochemical cell of claim 4 wherein the total thickness of the positive electrode, including the cathode current collector, is less than about 0.11 mm.

6. The electrochemical cell of claim 1 wherein a first area of the anode current collector contacted with anode material is at least about 95 cm$^2$.

7. The electrochemical cell of claim 1 wherein a second area of the cathode current collector contacted with cathode active material is at least about 80 cm$^2$.

8. The electrochemical cell of claim 1 wherein the casing has an external volume of about 5 cm$^3$, or less, and a ratio of the surface area of the cathode active material contacted to the cathode current collector to the external casing volume is greater than 35 cm$^{-1}$.

9. The electrochemical cell of claim 8 wherein a ratio of the surface area of the cathode active material contacted to the cathode current collector to the external casing volume is greater than 25 cm$^{-1}$.

10. The electrochemical cell of claim 1 wherein the anode material of the negative electrode is selected from the group consisting of hairy carbon, coke, carbon black, graphite, acetylene black, carbon fibers, glassy carbon, and mixtures thereof.

11. The electrochemical cell of claim 1 wherein the cathode active material is selected from the group consisting of lithiated oxides, lithiated sulfides, lithiated selenides, and lithiated tellurides of the group selected from vanadium, titanium, chromium, copper, molybdenum, niobium, iron, nickel, cobalt, manganese, and mixtures thereof.

12. The electrochemical cell of claim 1 wherein the anode material is mixed with a fluoro-resin binder.

13. The electrochemical cell of claim 1 wherein the cathode active material is mixed with a fluoro-resin binder.

14. The electrochemical cell of claim 1 wherein the cathode active material is mixed with a conductive additive selected from the group consisting of acetylene black, carbon black, graphite, nickel powder, aluminum powder, titanium powder, stainless steel powder, and mixtures thereof.

15. The electrochemical cell of claim 1 wherein the electrolyte comprises ethylene carbonate, dimethyl carbonate, ethylmethyl carbonate and diethyl carbonate.

16. The electrochemical cell of claim 15 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

17. The electrochemical cell of claim 1 wherein the anode material contacted to at least one of the first and second sides of the anode current collector is about 0.0175 mm to about 0.07 mm thick.

18. The electrochemical cell of claim 1 wherein the cathode active material contacted to at least one of the third and fourth sides of the cathode current collector is about 0.0625 mm to about 0.215 mm thick.

19. An electrochemical cell, which comprises:
a) a negative electrode of a carbonaceous material that intercalates and deintercalates with lithium and that is contacted to an anode current collector comprised of first and second spaced apart major sides, wherein the carbonaceous material contacted to at least one of the first and second major sides is about 0.0175 mm to about 0.07 mm thick;
b) a positive electrode comprising lithium cobalt oxide that intercalates and deintercalates with lithium and that is contacted to a cathode current collector comprised of third and fourth spaced apart major sides, wherein the lithium cobalt oxide contacted to at least one of the third and fourth major sides is about 0.0215 mm to about 0.0625 mm thick;
c) an electrolyte solution activating the negative electrode and the positive electrode; and
d) a casing housing the activated negative and positive electrodes.

20. The electrochemical cell of claim 19 wherein the anode material is contacted to both the first and second major sides of the anode current collector to provide the negative electrode having a total thickness, including the anode current collector, less than about 0.15 mm.

21. The electrochemical cell of claim 20 wherein the anode current collector is of copper.

22. The electrochemical cell of claim 20 wherein the total thickness of the negative electrode, including the anode current collector, is less than about 0.11 mm.

23. The electrochemical cell of claim 19 wherein the cat ode active material is contacted to both the third and fourth major sides of the cathode current collector to provide the positive electrode having a total thickness, including the cathode current collector, less than about 0.15 mm.

24. The electrochemical cell of claim 23 wherein the cathode current collector is of aluminum.

25. The electrochemical cell of claim 23 wherein the total thickness of the positive electrode, including the cathode Current collector, is less than about 0.11 mm.

26. The electrochemical cell of claim 19 wherein the casing has an external volume of about 5 cm³, or less, and a ratio of the surface area of the cathode active material contacted to the cathode current collector to the external casing volume is greater than 35 cm$^{-1}$.

27. In combination with an implantable medical device requiring at least one current pulse for a medical device operating function, a first electrochemical cell which is dischargeable to deliver the current pulse electrically coupled to a second electrochemical cell, the first cell comprising:
a) a casing;
b) a negative electrode of an anode material that intercalates and deintercalates with an alkali metal and that is contacted to an anode current collector comprised of first and second spaced apart major sides, wherein with the anode material contacted to at least one of the first and second major sides, the negative electrode has a total thickness, including the anode current collector, less than about 0.15 mm;
c) a positive electrode comprising a cathode active material that intercalates and deintercalates with the alkali metal and that is contacted to a cathode current collector comprised of third and fourth spaced apart major sides, wherein with the cathode active material contacted to at least one of the third and fourth major sides, the positive electrode has a total thickness, including the cathode current collector, less than about 0.15 mm;
d) an electrolyte solution activating the negative and positive electrodes housed inside the casing; and
e) wherein the first cell is rechargeable by the second cell.

28. The combination of claim 27 wherein a first area of the anode current collector contacted with anode material is at least about 95 cm².

29. The combination of claim 27 wherein a second area of the cathode current collector contacted with cathode active material is at least about 80 cm².

30. The combination of claim 27 wherein the second electrochemical cell is of a $Li/CF_x$ couple.

31. The combination of claim 27 wherein the first cell and the second cell are in separate casings.

32. The combination of claim 27 wherein the first cell and the second cell are in the same casing.

33. The combination of claim 27 wherein the casing has an external volume of about 5 cm³, or less, and a ratio of the surface area of the cathode active material contacted to the cathode current collector to the external casing volume is greater than 25 cm$^{-1}$.

34. A method for providing an electrochemical cell, comprising the steps of:
a) providing a casing;
b) providing a negative electrode comprising an anode material that intercalates and deintercalates with an alkali metal and that is contacted to an anode current collector comprised of first and second spaced apart major sides, wherein the anode material contacted to at least one of the first and second major sides is about 0.07 mm thick, or less;
c) providing a positive electrode comprising a cathode active material that intercalates and deintercalates with the alkali metal and that is contacted to a cathode current collector comprised of third and fourth spaced apart major sides, wherein the cathode active material contacted to at least one of the third and fourth major sides is about 0.0625 mm thick, or less; and
d) activating the negative electrode and the positive electrode housed inside the casing with an electrolyte.

35. The method of claim 34 wherein the anode current collector is of copper.

36. The method of claim 34 wherein the cathode current collector is of aluminum.

37. The method of claim 34 including contacting the anode material to both the first and second major sides of the anode current collector to provide the negative electrode having a total thickness, including the anode current collector, less than about 0.11 mm.

38. The method of claim 34 including contacting the cathode active material to both the third and fourth major sides of the cathode current collector to provide the positive having a total thickness, including the cathode current collector, less than about 0.11 mm.

39. The method of claim 34 including providing the casing having an external volume of about 5 cm$^3$, or less, such that a ratio of the surface area of the cathode active material contacted to the cathode current collector to the external casing volume is greater than 35 cm$^{-1}$.

40. The method of claim 34 including providing the electrolyte having an alkali metal salt dissolved in a quaternary nonaqueous carbonate solvent mixture comprising ethylene carbonate, dimethyl carbonate, ethylmethyl carbonate and diethyl carbonate.

41. The method of claim 40 wherein the ethylene carbonate is in the range of about 20% to about 50%, the dimethyl carbonate is in the range of about 12% to about 75%, the ethylmethyl carbonate is in the range of about 5% to about 45%, and the diethyl carbonate is in the range of about 3% to about 45%, by volume.

42. The method of claim 34 including selecting the anode material from the group consisting of hairy carbon, coke, carbon black, graphite, acetylene black, carbon fibers, glassy carbon, and mixtures thereof.

43. The method of claim 34 including selecting the cathode active material from the group consisting of lithiated oxides, lithiated sulfides, lithiated selenides, and lithiated tellurides of the group selected from vanadium, titanium, chromium, copper, molybdenum, niobium, iron, nickel, cobalt, manganese, and mixtures thereof.

44. The method of claim 34 including providing the casing having an external volume of about 5 cm$^3$, or less, such that a ratio of the surface area of the cathode active material contacted to the cathode current collector to the external casing volume is greater than 25 cm$^{-1}$.

45. The method of claim 34 including contacting the anode material to at least one of the first and second sides of the anode current collector to a thickness of about 0.0175 mm to about 0.07 mm.

46. The method of claim 34 including contacting the cathode active material to at least one of the third and fourth sides of the cathode current collector to a thickness of about 0.0625 mm to about 0.215 mm.

47. An electrochemical cell, which comprises:
a) a casing;
b) a negative electrode of an anode material that intercalates and deintercalates with an alkali metal contacted to an anode current collector comprised of first and second spaced apart major sides, wherein with the anode material contacted to both the first and second major sides, the negative electrode has a total thickness, including the anode current collector, less than about 0.15 mm;
c) a positive electrode comprising a cathode active material that intercalates and deintercalates with the alkali metal contacted to a cathode current collector comprised of third and fourth spaced apart major sides, wherein with the cathode active material contacted to both the third and fourth major sides, the positive electrode has a total thickness, including the cathode current collector, less than about 0.15 mm, and wherein a ratio of the surface area of the cathode active material contacted to the cathode current collector to the external casing volume is greater than 25 cm$^{-1}$; and
d) an electrolyte solution activating the negative and positive electrodes housed inside the casing.

48. An electrochemical cell, which comprises:
a) a negative electrode of a carbonaceous material that intercalates and deintercalates with lithium contacted to an anode current collector comprised of first and second spaced apart major sides, wherein with the anode material contacted to both the first and second major sides, the negative electrode has a total thickness, including the anode current collector, less than about 0.15 mm;
b) a positive electrode comprising lithium cobalt oxide contacted to a cathode current collector comprised of third and fourth spaced apart major sides, wherein with the cathode active material contacted to both the third and fourth major sides, the positive electrode has a total thickness, including the cathode current collector, less than about 0.15 mm;
c) an electrolyte activating the negative electrode and the positive electrode; and
d) a casing housing the activated negative and positive electrodes, wherein a ratio of the surface area of the lithium cobalt oxide contacted to the cathode current collector to the external casing volume is greater than 25 cm$^{-1}$.

49. In combination with an implantable medical device requiring at least one current pulse for a medical device operating function, a first electrochemical cell which is dischargeable to deliver the current pulse electrically coupled to a second electrochemical cell, the first cell comprising:
a) a casing;
b) a negative electrode of an anode material that intercalates and deintercalates with an alkali metal contacted to an anode current collector comprised of first and second spaced apart major sides, wherein with the anode material contacted to both the first and second major sides, the negative electrode has a total thickness, including the anode current collector, less than about 0.15 mm;
c) a positive electrode comprising a cathode active material that intercalates and deintercalates with the alkali metal contacted to a cathode current collector comprised of third and fourth spaced apart major sides, wherein with the cathode active material contacted to both the third and fourth major sides, the positive electrode has a total thickness, including the cathode current collector, less than about 0.15 mm, and wherein a ratio of the surface area of the cathode active material contacted to the cathode current collector to the external casing volume is greater than 25 cm$^{-1}$;
d) an electrolyte activating the negative and positive electrodes housed inside the casing; and
e) wherein the first cell is rechargeable by the second cell.

50. A method for providing an electrochemical cell, comprising the steps of:
a) providing a casing;
b) providing a negative electrode comprising an anode material that intercalates and deintercalates with an alkali metal contacted to an anode current collector comprised of first and second spaced apart major sides, wherein with the anode material contacted to both the first and second major sides, the negative electrode has a total thickness, including the anode current collector, less than about 0.15 mm;

c) providing a positive electrode comprising a cathode active material that intercalates and deintercalates with the alkali metal contacted to a cathode current collector comprised of third and fourth spaced apart major sides, wherein with the cathode active material contacted to both the third and fourth major sides, the positive electrode has a total thickness, including the cathode current collector, lees than about 0.15 mm, and wherein a ratio of the surface area of the cathode active material contacted to the cathode current collector to the external casing volume is greater than 25 $cm^{-1}$; and d) activating the negative electrode and the positive electrode housed inside the casing with an electrolyte.

51. An electrochemical cell, which comprises:

a) a casing;

b) a negative electrode of an anode material that intercalates and deintercalates with an alkali metal and that is contacted to an anode current collector comprised of first and second spaced apart major sides, wherein with the anode material contacted to at least one of the first and second major sides, the negative electrode has a total thickness, including the anode current collector, less than about 0.15 mm;

c) a positive electrode comprising a cathode active material that intercalates and deintercalates with the alkali metal and that is contacted to a cathode current collector comprised of third and fourth spaced apart major sides, wherein with the cathode active material contacted to at least one of the third and fourth major sides, the positive electrode has a total thickness, including the cathode current collector, less than about 0.15 mm; and d) an electrolyte solution activating the negative and positive electrodes housed inside the casing, wherein the electrolyte comprises ethylene carbonate, dimethyl carbonate, ethyl methyl carbonate and diethyl carbonate.

52. A method for providing an electrochemical cell, comprising the steps of:

a) providing a casing;

b) providing a negative electrode comprising an anode material that intercalates and deintercalates with an alkali metal and that is contacted to an anode current collector comprised of first and second spaced apart major sides, wherein with the anode material contacted to at least one of the first and second major sides, the negative electrode has a total thickness, including the anode current collector, less than about 0.15 mm;

c) providing a positive electrode comprising a cathode active material that intercalates and deintercalates with the alkali metal and that is contacted to a cathode current collector comprised of third and fourth spaced apart major sides, wherein with the cathode active material contacted to at least one of the third arid fourth major sides, the positive electrode has a total thickness, including the cathode current collector, less than about 0.15 mm; and d) activating the negative electrode and the positive electrode housed inside the casing with an electrolyte comprising ethylene carbonate, dimethyl carbonate, ethyl methyl carbonate and diethyl carbonate.

\* \* \* \* \*

UNITED STATES PATENT AND TRADEMARK OFFICE
CERTIFICATE OF CORRECTION

PATENT NO.     : 6,641,953 B2
DATED          : November 4, 2003
INVENTOR(S)    : Takeuchi et al.

It is certified that error appears in the above-identified patent and that said Letters Patent is hereby corrected as shown below:

Column 8,
Line 32, "he" should be -- the --

Column 11,
Line 7, -- electrode -- should be inserted before "having"

Column 14,
Line 23, "arid" should be -- and --

Signed and Sealed this

Tenth Day of February, 2004

JON W. DUDAS
*Acting Director of the United States Patent and Trademark Office*